United States Patent

[11] 3,561,348

| [72] | Inventor | John E. Weir, Sr. |
| | | Vine Grove, Ky. |
| [21] | Appl. No. | 748,726 |
| [22] | Filed | July 30, 1968 |
| [45] | Patented | Feb. 9, 1971 |
| [73] | Assignee | Weir Magic Pit Corporation |
| | | Frankfort, Ky. |
| | | a corporation of Kentucky |

[54] BARBECUE OVEN
6 Claims, 5 Drawing Figs.

[52] U.S. Cl.................................................. 99/259,
99/446; 126/25
[51] Int. Cl..................................................... A23b 3/04
[50] Field of Search........................................... 126/59.5,
25; 99/259, 260, 400, 444, 445, 446, 107

[56] References Cited
UNITED STATES PATENTS

| 1,595,846 | 8/1926 | Wood............................ | 99/446 |
| 2,143,999 | 1/1939 | Rosson......................... | 126/25 |
| 2,168,388 | 8/1939 | Bemis........................... | 99/259 |
| 2,314,627 | 3/1943 | Millikan et al................. | 126/25X |
| 2,568,022 | 9/1951 | Parker........................... | 99/259 |
| 3,098,428 | 7/1963 | Maxwell........................ | 99/446 |
| 3,266,409 | 8/1966 | Oyler............................. | 99/259 |

*Primary Examiner*—Billy J. Wilhite
*Attorney*—William R. Price

ABSTRACT: Discloses a barbecue oven designed for unattended operation through the use of a limited air supply, a limited emission of combustion products from the unit, the placement of the meat relative to the firebox, return of meat drippings to the firebox to wet the coals and facilitate formation of smoke within the unit. The unit is fabricated of heat retaining insulated walls and the flow of air through the unit is controlled through the use of partially open dampers in the air inlet and in the flue so that the rate of combustion is controlled to allow for unattended continuous cooking.

PATENTED FEB 9 1971
3,561,348
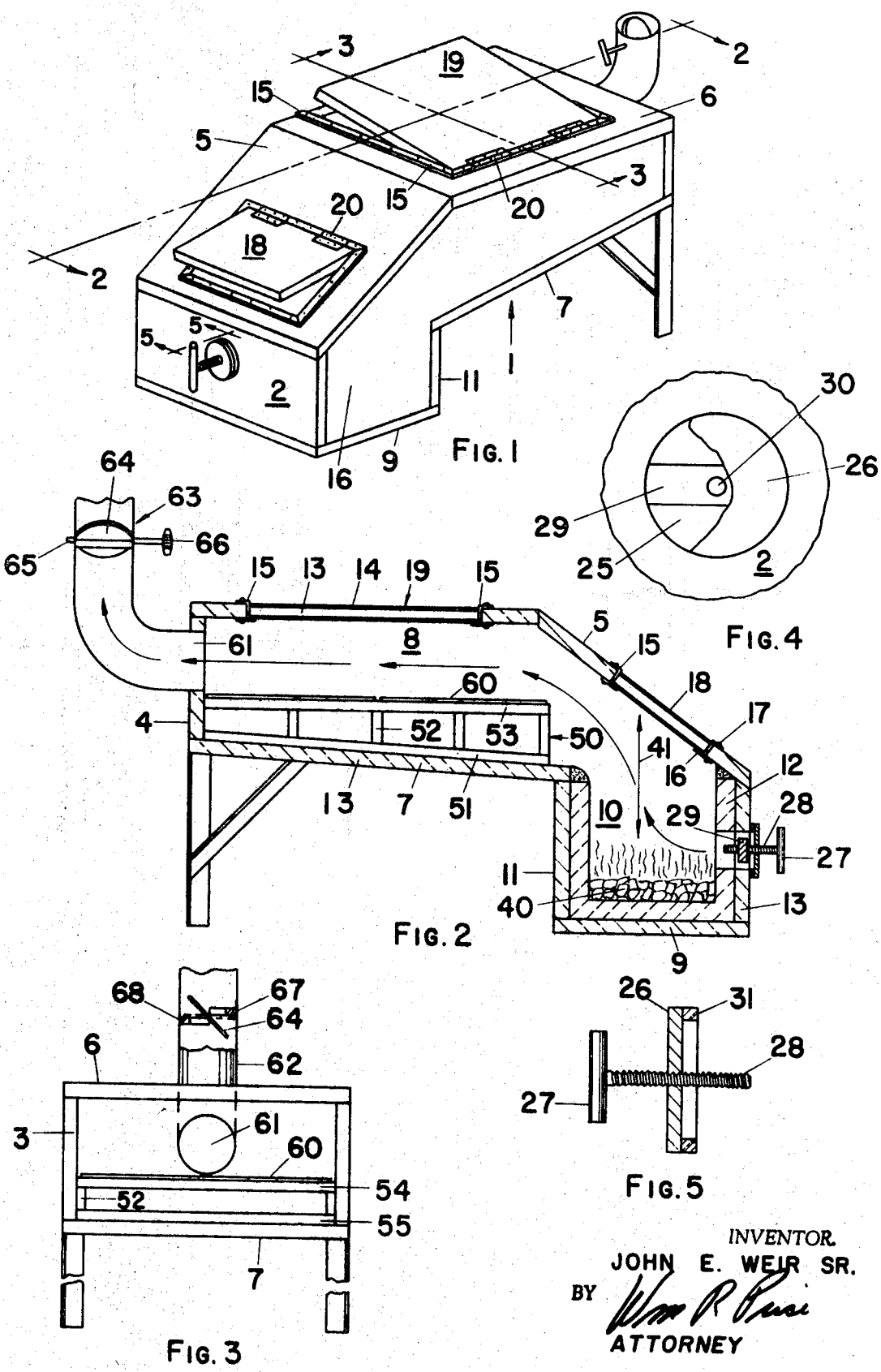
INVENTOR.
JOHN E. WEIR SR.
BY
ATTORNEY

BARBECUE OVEN

FIELD OF THE INVENTION

This invention relates to improvements in a barbecue cooking oven and is particularly concerned with an oven which will uniformly distribute heat and smoke about the meat being cooked and will allow for continuous and unattended operation.

DESCRIPTION OF THE PRIOR ART

Meat cooked by direct exposure to gases and smoke given off by burning wood or charcoal is known as barbecue. Meat cooked by this method has commonly been disposed on a grill directly over a bed of coals so that the gaseous heat and smoke emanating from the coals passed upwardly about the meat to cook same. A problem with the conventional barbecue has been in the fact that there was no way to uniformly control the heat supply to the meat and to facilitate smoking of the coals in a uniform manner so that the smoke and heat penetrates throughout the meat to impart a characteristic barbecue flavor. As a result in some instances the coals would get too hot and the meat would sear and even burn on one side while being undercooked and raw on the other. It was also necessary to constantly attend the pit, adding fuel, in some cases wetting the fuel, and manipulating the coals to maintain the coal bed and the smoke and heat emanating therefrom at a constant and uniform level. For this reason, and for the reason of the difficulty and expense of getting competent help, many commercial institutions and restaurants have been unable to provide a good barbecue and consequently this item has not been served in many eating establishments.

Many proposals have been made as to closed cooking units, all of which have met with considerable difficulty. One of the problems was in the disposition of the meat drippings and grease from the meat which in the conventional open pit barbecue fed directly into the coal bed facilitating smoke formation and imparting a characteristic flavor to the cooked meat. In a closed oven, however, the meat drippings had to be diverted to a drip pan and removed from the oven; otherwise, there was the danger of a grease fire in the closed unit.

Accordingly the flavor imparted by the smoke created by the meat drippings wetting the coals of the coal bed was lost, a cleaning and storage problem resulted, and the characteristic flavor of the barbecue meat was not obtained because of the absence of the smoke caused by the burning meat drippings and sauce.

Another problem has been in obtaining a substantially constant temperature in the cooking zone. Previous attempts along this line have employed thermostatically controlled dampers in the passageway leading from the combustion zone into the cooking zone. However, when such a damper closes, it inevitably causes smoke to be emitted from the firebox in some other direction and is undesirable for that reason; and in addition, it tends to direct the heat from the firebox into one portion of the cooking zone more than into others. Additionally, the location of the thermostat in such devices has been such that it is subjected to almost direct action of the hot gases from the fire and for this reason must be set to stay open under much higher cooking temperatures than desired throughout the cooking zone. For this reason, a stable cooking temperature has not resulted. Furthermore, in most instances the thermostat controlled a solenoid connected to a damper so that the damper was either full open or full closed, i.e., either allowing a complete flow of air into the combustion zone or no air at all resulting in extremes in the rate of combustion of the fuel. This resulted in fluctuations in the rate of combustion, undue consumption of fuel, and erratic fluctuation of temperatures in the cooking zone.

SUMMARY OF THE INVENTION

According to the present invention, unattended operation of the unit is obtained by providing a uniform continuous and limited supply of air into the combustion zone and simultaneously limiting the emission of combustion products from the unit at a uniform and continuous rate so that the rate of combustion in the combustion zone is maintained constant. This is accomplished by means of a damper in operative relation with the air intake located in the wall of the unit at a point above the normal fuel level of the firebox. The damper is opened in a precise small increment so as to limit the air flow into the firebox. At the other end of the unit a damper in the flue is opened in a small increment to limit the emission of the products of combustion from the unit and to control the flow of air therethrough so as to provide a uniform rate of combustion. Secondly, the firebox is located at one end of the unit at a much lower level than the level of the barbecuing chamber and there is direct communication between the firebox and the barbecuing chamber so that the combustion products from the firebox flow directly over and around and under the meat supported on racks in the barbecuing chamber to impart the desired savory flavor. The floor of the barbecuing chamber is inclined downwardly so as to divert the drippings from the meat back into the firebox to wet the coal bed and facilitate smoke formation. Further, since the meat drippings are directed into the bed of coals they are burned and eliminate a disposal problem and act as a source of fuel.

The unit per se is gastight except for the dampers in the firebox and the flue so that the moisture produced by the combustion of the hydrocarbons in the firebox produces a certain amount of water vapor, and the moisture of the meat dripping from the racks creates an equilibrium between the moisture in the meat and the moisture in the atmosphere so that there is less shrinkage and the resulting cooked meat is much more moist than has been the case with the conventional open pit barbecue wherein excess moisture was evacuated into the atmosphere. Further, since the combustion rate of the fuel in the firebox is maintained constant through the uniform flow of air, the meat does not sear or burn but cooks evenly at a comparatively low temperature throughout and is exceedingly tender with the imparted flavor of the smoke generated by the fuel.

BRIEF DESCRIPTION OF THE DRAWINGS

FIG. 1 is a view in perspective of the barbecuing oven of my invention.

FIG. 2 is a longitudinal sectional view partially in elevation taken along lines 2–2 of FIG. 1.

FIG. 3 is a sectional view taken along lines 3–3 of FIG. 1 illustrating the relation of the meat racks to the floor of the barbecuing chamber and the relation of the flue and the damper in the flue to the barbecuing chamber.

FIG. 4 is an enlarged fragmentary view, with portions broken away, illustrating the damper and the air intake which communicates with the firebox and the location of the transverse bar into which the threaded rod of the damper is threadably engaged.

FIG. 5 is a sectional view taken along lines 5–5 of FIG. 1 illustrating the insulated gasket on the damper plate of the first damper.

DESCRIPTION OF THE PREFERRED EMBODIMENT

Referring now to the drawings, the barbecue oven 1 contains a frontwall 2, sidewalls 3, a rearwall 4, a top inclined wall 5, and a top horizontal wall 6. The floor 7 of the barbecuing chamber 8, is contiguous with the rear transverse wall 11 of firebox 10. The floor of firebox 10 is illustrated by numeral 9. The firebox 10 is lined with refractory brick on top of a Marinite insulation which is an insulation produced by the Johns-Mannsville Company.

Located in the top inclined wall 5 and the top horizontal wall 6 are door frames 15 fabricated of aluminum angles and which contain at the bottom a Transite insulated door stop 16 which is bolted into place 17 through the angle frame 15. The doors 18 and 19 contain inner core members 13 of the Marinite insulation to which sheets of Transite insulation 14 are adhesively secured. The door 18, which communicates through the top wall 5, is directly over the firebox 10 and is hinged to the frame 15 by hinges 20. Fuel may be placed into the firebox and ashes removed from the firebox by merely opening the door 18. Similarly door 19 is located over the barbecuing chamber 8 for placing meat onto the racks 60 in the barbecuing chamber.

Referring now in some detail to FIG. 4, the air intake 25 is located in front wall 2 of the unit and is in communication with the firebox 10 and the atmosphere. A transverse bar 29 is mounted across the air intake 25 and contains a threaded bore 30. The damper plate 26 is circular and extends slightly over the circumference or perimeter of the air intake 25. A rod 28 is welded onto the damper plate 26 and is threaded so as to engage into the threaded bore 30 and contains a handle 27 on the outside for precise manipulation of the damper plate relative to the air intake 25. An annular insulated gasket 31 is cemented onto the perimeter of the interior surface of damper plate 26 so as to seat with the surface of front wall 2 of the unit in the area surrounding the air intake 25. It will be noted that the level of the fuel 40 is below the level of the air intake 25. It will be noted further that a line illustrating the vertical axis 41 of the firebox terminates at about the midpoint of the barbecuing chamber 8. Further, the rear transverse wall 11 of the firebox 10 is contiguous with the inclined floor 7 of the barbecuing chamber 8. For this reason, meat drippings and grease from the meat supported on the rack 60 are directed down the inclined floor 7 of the barbecuing chamber and into the firebox 10 to wet the coals 40 in the firebox 10 to facilitate the formation of smoke, and to serve as fuel, and to impart the characteristic barbecue flavor to the meat on the rack 60.

Rack 60 is supported in the barbecuing chamber 8 on frame 50 consisting of lower longitudinal members 51, upright posts 52, and top longitudinal members 53. The top and bottom longitudinal members 51 and 53, respectively, are maintained in spaced relation by transverse members 55 and 54, respectively.

At the far end of the barbecuing chamber 8, in rearwall 4, is located flue opening 61 into which is inserted a smokestack 62 containing damper 63. The damper 63 consists of an imperforate damper plate 64 supported on rod 65 which extends through stack 62 and contains a handle 66 at one end. Above the upper surface of the damper plate 64 is an upper segment of an annular insulation ring 67, cemented onto the interior surface of stack 62 and below the surface of the damper plate 64 is a lower segment 68 of an annular ring of insulation cemented into position onto the inner surface of stack 62. Thus when the damper 63 is closed so that damper plate 64 is in horizontal relation the upper and lower surfaces of the plate are in rubbing contact with the upper segment 67 and the lower segment 68, respectively, to completely seal the flue 61 and stack 62. By manipulating handle 66 the damper 64 can be partially opened in comparatively precise increments to control the emission of smoke, heat, and combustion products from the barbecuing chamber 8.

As previously indicated, the first damper 26 is also equipped with an annular insulated gasket 31 and contains a threaded rod 28 engageable with a threaded bore 30 in transverse bar 29. Therefore, by manipulation of the damper plate 26 with handle 27 the annular gasket 31 can be tightly seated against the surface of the wall 2 in an area directly surrounding the air inlet 25. This effectively seals out all air from the firebox 10.

OPERATION

To operate the unit, the damper 26 and the damper 63 are completely open. Fuel in the form of charcoal, hickory wood, or crabapple wood is added to the floor 9 of the firebox 10 through the door 18. Charcoal lighting fluid or other material may be added to ignite the fuel 40 in the firebox. Once the fuel is ignited, the door is closed, the dampers are left open until a good firebed is obtained. Thereafter, the door 19 is opened, and the meat, preferably brushed with barbecue sauce, is placed onto the horizontally disposed racks 60. Thereafter the door 19 is securely closed against the Transite door stops 16 so that the doors are completely sealed against escape or introduction of air. At this point the damper 63 is completely closed and damper 26 is screwed down through the engagement of rod 28 with threaded bore 30 until the annular gasket 31 seats against the surface of the wall 2. The damper 26 then is opened by manipulating the handle one-quarter of a full revolution. At the same time or shortly thereafter, handle 66 is turned so that the damper plate 64 is barely open and the upper and lower surfaces are just out of contact with the segments 67 and 68 of the ring insulation. At this point, there should be just a very small wisp of smoke coming from the top of the stack 62.

By opening the dampers in this manner there will be sufficient air drawn into the unit to support the combustion of the fuel bed throughout the night or throughout several hours depending upon the length of time required for cooking the meat. It is no longer necessary to have an attendant available to wet the coals, to stir the coals, to open and close the dampers or to turn the meat. The combustion products of the fuel and of the meat drippings which flow from the meat rack 60 onto inclined floor 7 and then into the firebox 10 to wet the coals facilitates smoke formation, create an equilibrium of moisture in the atmosphere and the meat, so that the meat is uniformly cooked without undue shrinkage and without losing its natural moisture. The smoke and heat evenly permeates the meat particularly through the veins of fat which are melted and dripped back into the fire. There is a coaction between the smoke and combustion products to evenly impart a savory flavor throughout the meat during the cooking process.

I have found that the temperature in the barbecuing chamber 8 ranges from about 225 to 250 and is maintained at this temperature through the use of the controlled flow of air and the controlled emission of combustion products from the stack during the entire cooking procedure. The resulting barbecued meat is savory and delicious and is permeated throughout with the flavor of smoke and sauce.

The cooking schedule for chicken and ribs is generally from 3 to 4 hours. If pork picnic or shoulders are used, cooking is normally about 10 hours or overnight. If a brisket of beef is cooked, the cooking time is normally 4 hours. If a beef rump is barbecued, the cooking time is again about 10 hours or overnight.

By use of this invention it is possible for the proprietor of a restaurant to place pork shoulders or beef rump into the barbecuing chamber on racks 60 the night before barbecue is to be served, start the fire, manipulate the dampers to control the air intake and combustion product emission and leave for the night to find the meat perfectly cooked the next morning when he arrives. This meat can be placed in a warming oven or on a steam table and some chicken and ribs can be then placed in the oven to be ready for the noontime rush.

By the use of this invention there is provided a means and apparatus whereby meat may be easily, quickly, and economically barbecued, without constant attention, without increasing the staff, without undue shrinkage of the meat, and without creating a problem of grease fires and grease disposal which has been a problem with closed units. Further, there is no danger of searing of the meat on one side with it being undercooked on the other or is there any danger of dryness and undue consumption of fuel.

While many modifications will occur to those skilled in the art from the detailed description hereinabove given, such description is meant to be exemplary in nature and nonlimiting except as to be commensurate in scope with the appended claims.

I claim:

1. A barbecuing oven, for barbecuing meat, which comprises:
    A. an essentially gastight housing, including front, side, rear, and top insulated walls and a floor;
        1. said housing including a firebox at one end;

2. an air inlet in the wall of said housing in communication with said firebox;
3. a barbecuing chamber at the other end, said barbecuing chamber being in communication with said firebox;
   a. said barbecuing chamber being spaced away from the vertical axis of said firebox and vertically spaced above said firebox;
   b. said barbecuing chamber containing a support rack for said meat, said support rack being spaced vertically above the floor of said barbecuing chamber;
   c. said floor of said barbecuing chamber being inclined downwardly in the direction of said firebox to direct meat drippings into said firebox to wet the coals in said firebox and facilitate formation of smoke;
4. an exhaust flue in communication with said barbecuing chamber;
5. combustion control means for controlling combustion in said firebox to allow for unattended operation of said barbecue oven, comprising;
   a. a damper in operative relation with said air inlet, said damper which when in closed position, effectively seals said air inlet and when in full open position allows free flow of air through said air inlet means for opening and closing said damper in small increments to effect a limited and uniform flow of air through said air inlet; and
   b. a damper in said exhaust flue, said damper which, in closed position, effectively seals said flue, and when in full open position, allows free flow of gases through said flue, said second damper being manipulatable to partially open and close said flue to control the flow of gases through said flue.

2. A barbecuing oven, as defined in claim 1, in which:
   A. said firebox is bounded at the rear wall with a transversely disposed rear wall which is contiguous at the top with the edge of the floor of said barbecuing chamber.

3. A barbecuing oven, as defined in claim 1, in which said air inlet is located at a point above the floor of said firebox and above the normal level of coals in said firebox.

4. A barbecuing oven, as defined in claim 1, in which said first damper includes an insulated gasket designed to seat against said air inlet.

5. A barbecuing oven, as defined in claim 1, in which said means for opening and closing said first damper includes a threaded rod attached to said damper, in combination with a bar extending transversely across said air inlet, said bar containing a threaded bore in which said rod is engageable for precise adjustment.

6. A barbecuing oven, as defined in claim 1, the further combination with said second damper of equal segments of an insulated gasket, conforming to the internal diameter of said flue, one segment secured to said flue above said damper, and the other segment secured to the flue below said damper, on opposite sides and on opposite halves of said damper to limit the movement of said damper and to completely seal the flue, when said damper is in closed position.